(12) United States Patent
Bao et al.

(10) Patent No.: US 8,768,936 B2
(45) Date of Patent: Jul. 1, 2014

(54) METHOD AND APPARATUS FOR RECOMMENDING INFORMATION TO USERS WITHIN A SOCIAL NETWORK

(75) Inventors: Shenghua Bao, Beijing (CN); Jian Chen, Beijing (CN); Cheng En Lu, Beijing (CN); Rui Ma, Beijing (CN); Zhong Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 13/160,593

(22) Filed: Jun. 15, 2011

(65) Prior Publication Data

US 2011/0320462 A1   Dec. 29, 2011

(30) Foreign Application Priority Data

Jun. 29, 2010   (CN) .......................... 2010 1 0213933

(51) Int. Cl.
*G06F 17/30* (2006.01)
(52) U.S. Cl.
USPC ....................................................... 707/749
(58) Field of Classification Search
None
See application file for complete search history.

(56) References Cited

U.S. PATENT DOCUMENTS

| | | | | |
|---|---|---|---|---|
| 7,908,183 | B2* | 3/2011 | Jacobi et al. | 705/26.7 |
| 2002/0107758 | A1* | 8/2002 | Takakura et al. | 705/26 |
| 2007/0143281 | A1* | 6/2007 | Smirin et al. | 707/5 |
| 2007/0203790 | A1* | 8/2007 | Torrens et al. | 705/14 |
| 2009/0259621 | A1* | 10/2009 | Svendsen et al. | 707/3 |
| 2010/0106730 | A1 | 4/2010 | Aminian et al. | |

* cited by examiner

*Primary Examiner* — Rehana Perveen
*Assistant Examiner* — Hung Havan
(74) *Attorney, Agent, or Firm* — Cantor Colburn LLP

(57) ABSTRACT

A method and an apparatus for recommending information to users within a social network. The method builds a recommendation list with at least one two-tuple, where each two-tuple comprises a target user name and an information item and ranks the recommendation list by using two-tuples in the recommendation list as a basic unit. By selecting a two-tuple in the recommendation list, the user can recommend a corresponding information item to a user represented by a target user name. An apparatus is also provided by using a builder for building for a user a recommendation list comprising at least one two-tuple and a sorter for ranking the recommendation list by using two-tuples in the recommendation list as a basic unit, such that, by selecting a two-tuple in the recommendation list.

20 Claims, 7 Drawing Sheets

600

| Target User1 | Information1 |
|---|---|
| Target User2 | Information1 |
| Target User3 | Information2 |
| Target User4 | Information3 |
| Target User4 | Information4 |

Fig. 6A

| ▼ Target User4 | Information3 |
|---|---|
| | Information4 |

Fig. 6B

| ▼ Information1 | Target User1 |
|---|---|
| | Target User2 |

Fig. 6C

METHOD AND APPARATUS FOR RECOMMENDING INFORMATION TO USERS WITHIN A SOCIAL NETWORK

CROSS-REFERENCE TO RELATED APPLICATION

This application claims priority under 35 U.S.C. §119 from Chinese Patent Application No. 201010213933.0 filed Jun. 29, 2010, the entire contents of which are incorporated herein by reference.

FIELD OF THE INVENTION

Embodiments of the present invention relate to data processing, and more particularly, to a method and an apparatus for recommending information to users within a computer network-based social network and a relevant computer program product.

BACKGROUND OF THE INVENTION

With the evolution of computer technology, communications technology, and various other multimedia transmission technologies, manners of providing information become increasingly diverse. Therefore, an information provider (such as an advertiser, a news provider, a manufacturer, etc) starts providing information to potential recipients in various manners, for example, publishing information to the public via a computer network, television network, a broadcast network, etc.; sending emails, MMS (Multi-media Message Service), and SMS (Short Message Service) to a particular recipient; and offering phone promotion directly via a fixed phone or a mobile phone. Common recipients start focusing on how to manage various information which they have received and recommend useful information to other people who can require such information.

For common recipients of information, they generally recommend information to other people manually. For example, a user receives an email from other users via the Internet, while this email comprises information about IBM software products. When the user intends to provide information about these new products to other friends, he/she usually needs to select email addresses of other users from the contact list to forward this email to the desired users. If the same user finds a technical article about an IBM hardware product published or forwarded by a certain user in a social website, the user can opt to repost the technical article about the IBM hardware product to different users within the social website, or opt to repost it to all other users.

Accordingly, a user can receive information in various manners, while the user can further recommend information to other users in a manner identical to or different from the manner in which he or she receives the information. Managing the recommended information manually is a time-consuming and complex work, and the user has to consider various aspects of factors: to whom the information is provided, what information to be provided, how to provide the information, whether to initiatively search information of other user's interest based on their preferences, etc. For a user who reads little information every day and has a few friends, manually recommending information can be realistic. However, when the user is within a gigantic social network and faces a considerable amount of information every day, it can become unfeasible to recommend information to other people manually.

In a real world, a user can have multiple aspects of attribute such as age, gender, address, graduate school, occupation, hobbies, etc., which will affect the types of information of the user's interest. The user further intends to provide information to other users in a plurality of manners (such as via the internal message within the website, email, SMS, instant message, MMS, paging service, and even directly using voice telephone).

There is a proposed a solution which can facilitate sharing of particular information from one user to other users (for example, through "group"), in which a user can quickly share some information he/she has accessed to other users in a group where he/she is in. Additionally, the user can participate in a plurality of groups across a plurality of social websites, or intend to recommend information to users in the plurality of groups. Those skilled in the art can know that groups are provided with respect to a particular social website, and the basis for sharing information between users in a group is that these users are registered users of the same social website (for example, a web community or an instant messenger, etc.), so that they can share group services provided by the social website.

SUMMARY OF THE INVENTION

According to one aspect of this invention, a method is provided for facilitating recommending information by users within a computer social network. The method includes building for a user a recommendation list comprising at least one two-tuple, where each two-tuple comprises a target user name and information item. This method further includes ranking the recommendation list by using two-tuples in the recommendation list as basic units, such that, by selecting a two-tuple in the recommendation list, the user can recommend a corresponding information item to a user represented by a target user name.

According to a further aspect of this invention, an apparatus is provided for facilitating recommending information by a user to other users within a computer social network. The apparatus includes a builder for building for a user a recommendation list comprising at least one two-tuple, where each two-tuple comprises a target user name and information item. This apparatus further includes a sorter for ranking the recommendation list by using two-tuples in the recommendation list as basic units, such that, by selecting a two-tuple in the recommendation list, the user can recommend a corresponding information item to a user represented by a target user name.

BRIEF DESCRIPTION OF THE DRAWINGS

Features, advantages, and other aspects of various embodiments of the present invention will become more apparent through the following detailed description with reference to the following drawings:

FIGS. 6A to 6C illustrate different modes of displaying a recommendation list according to one embodiment of the present invention.

DETAILED DESCRIPTION OF THE EMBODIMENTS

The flowcharts and block in the figures illustrate the system, methods, as well as architecture, functions and operations executable by a computer program product according to the embodiments of the present invention. In this regard, each block in the flowcharts or block can represent a module, a program segment, or a part of code, which contains one or more executable instructions for performing specified logic functions. It should be noted that in some alternative implementations, functions indicated in blocks can occur in an order differing from the order as illustrated in the figures. For example, two blocks illustrated consecutively can be performed in parallel substantially or in an inverse order. This depends on relevant functions. It should also be noted that each block in the block diagrams and/or flowcharts and a combination of blocks in the block diagrams and/or flowcharts can be implemented by a dedicated hardware-based system for performing specified functions or operations or by a combination of dedicated hardware and computer instructions.

Figure 1:
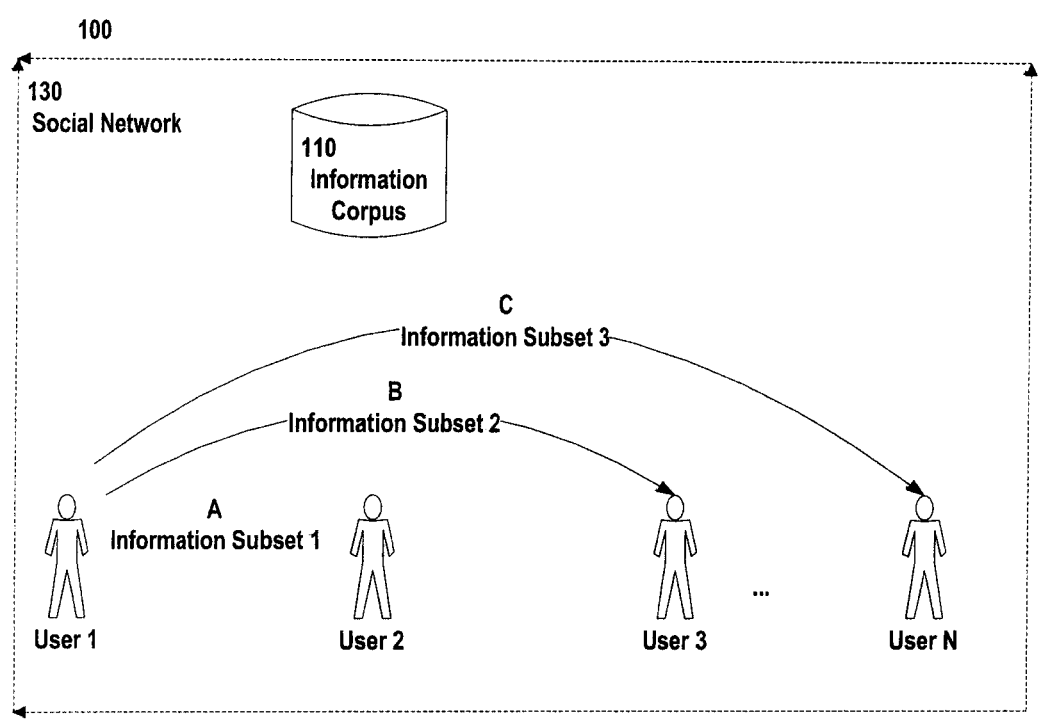
FIG. 1 illustrates a method for recommending information to users within a social network according to a technical solution.

FIG. 1 schematically illustrates a method 100 for recommending information to users within a social network according to a technical solution. It should be noted that according to the embodiment of the present invention, a social network 130 is not limited to a conventional social website, but can include, but is not limited to, a social network of social websites, a social network of instant messengers, a social network of mobile communications tools, a social network of fixed phones, and even a social network in a virtual world, and their combinations. In other words, the social network 130 in this embodiment is an integral network built by users interlinked in any communication manner, while the communication manner includes, but is not limited to, manners such as internal messages of a website, emails, SMSs, instant messages, paging services, MMSs, and even a manner of directly using voice phone.

Further, according to one embodiment of the present invention, an information corpus 110 as illustrated in FIG. 1 can be various media information perceptible by users in the social network 130 visually, audibly, tactilely, or in other manner, including, but not being limited to, information in a format such as text, image, audio, and video.

It should be noted that although a current user typically only recommends information to other users than himself/herself, the present invention does not preclude the circumstances of recommending information to himself/herself. Because the current user is also a user of a social network and has a user name conforming to a user name naming rule in the social network, the manner of self information recommendation of the current user is also similar.

As illustrated in FIG. 1, the social network 130 can include a plurality of users, for example, user 1, user 2, user 3, . . . , and user N. For example, with user 1 as an example of the current user, the method for recommending information to users in the social network 130 can be summarized as below. User 1 can receive information from different sources in any manner, for example, receiving an email (information 1) regarding a latest IBM hardware product, and intending to forward this email to his/her colleagues (for example, user 2 and user 3); receiving a message (information 2) regarding classmate gathering from the "College Classmates" group within a social website, and intending to forward (for example, via email or SMS) to other college classmates (for example, user 2) not in this group; or reading an article (information 3) regarding photography techniques from a photography forum, and intending to forward this article to all acquainted photography fans (for example, user N).

In the above example, the process of user 1 recommending information to users in the social network 130 is depicted as below. As indicated by arrows A, B, and C in FIG. 1, user 1 intends to provide different information subsets 1, 2, and 3 to user 2, user 3, and user N, respectively. Table 1A, Table 1B, and Table 1C as below schematically illustrate contents in the information subsets 1, 2, and 3 provided by user 1 to other target users, respectively.

TABLE 1A

| Information Subset Provided to User 2 |
|---|
| Information |
| Email (info 1) regarding a latest IBM hardware product<br>Message (info 2) regarding classmate gathering |

TABLE 1B

| Information Subset Provided to User 3 |
|---|
| Information |
| Email (info 1) regarding a latest IBM hardware product |

TABLE 1C

| Information Subset Provided to User N |
|---|
| Information |
| An article (info 3) regarding photography techniques |

Accordingly, user 1 intends to provide different information subsets to different users. The situation is already quite complex in the above schematic example including only 4 users and 3 pieces of information. Those skilled in the art can imagine that when user 1 receives dozens or even hundreds of pieces of information (for example, M pieces of information) every day and intends to execute recommendation to dozens of or more friends (for example, N friends), it is required to compare each piece of information with the content of each friend (M*N times of comparison) to determine whether to forward this piece of information to the friend, so the workload will be overwhelmingly heavy. In a manner of recommending information manually, a user very likely gives up providing information to friends because of trivial operations, such that friends cannot share information well, and it is also possible that many pieces of importance information cannot reach target users, for example, an excellent product can not sell well because of poor promotion.

Therefore, urgently desirable is a method for recommending information to users within a computer network-based social network, and this method is expected to facilitate a user in recommending information to desired users in a convenient, quick and accurate manner.

In one embodiment of the present invention, a user builds a recommendation list including at least one two-tuple, wherein each two-tuple includes a target user name and information item. Further, using each two-tuple as a basic unit, ranking is performed to two-tuples in the recommendation list, to provide a reference for the user upon recommending corresponding information items to users represented by target user names.

Figure 2:
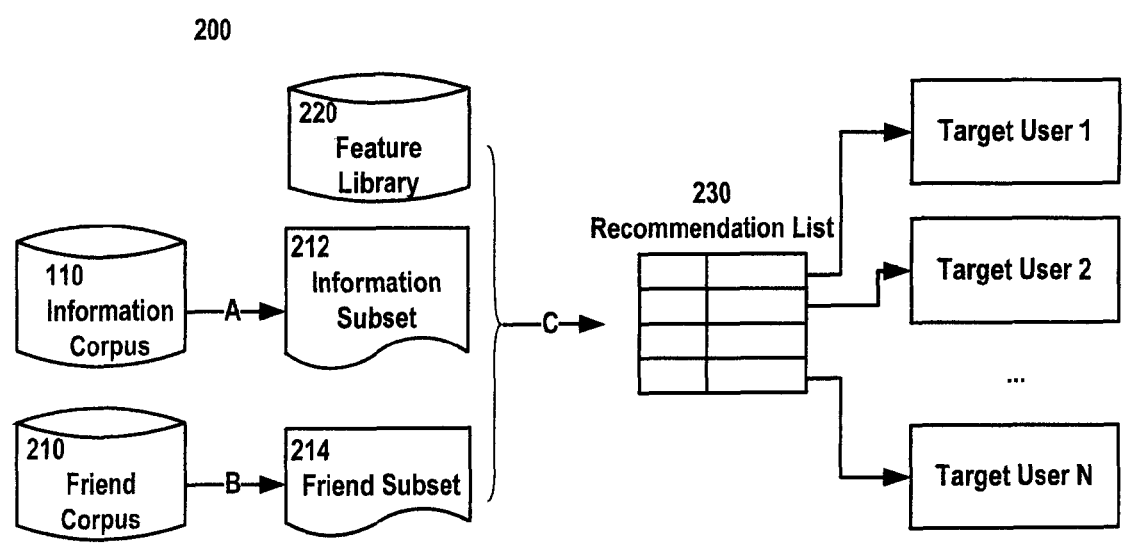
FIG. 2 illustrates a method for recommending information to users within a social network according to one embodiment of the present invention.

FIG. 2 schematically illustrates a method 200 for recommending information to users within a social network according to one embodiment of the present invention. According to the method 200, a recommendation list 230 including two-tuples is built for a current user, wherein each two-tuple includes a target user name and information item. For example, a two-tuple can be in a form of (target user name, information item). A recommendation list is displayed to the current user by a method for building a recommendation list using two-tuples, and the current user can automatically send corresponding information items to target users only by selecting desired two-tuples from the list. At this time, the user need not manually determine "providing what information to whom" or forward this information one by one. The complexity of manual user operation can be greatly simplified by only a simple mouse selection operation.

Besides, when building a recommendation list, the two-tuples can be ranked with each two-tuple as an atomic object, so as to facilitate the current user in selecting a two-tuple with a high recommendation value to recommend. Therefore, recommendation accuracy is enhanced while facilitating the current user in providing recommendation.

Now, the method 200 according to one embodiment of the present invention will be described with reference to FIG. 2. As illustrated in FIG. 2, a part of valuable information can be obtained by filtering from the information corpus 110 so as to establish an information subset 212 (as indicated by arrow A). It should be noted that the reason for setting this filtering step is that each user in the social network will receive a great amount of information every day, which information not only includes some useful information, but also likely includes a great amount of spam information (for example, spam advertisements, negative information, even fraud information). At this point, it is necessary to filter out such useless information based on settings of the current user, so as to fulfill the objective of "retaining the useful and true" and further perform a next recommendation operation only with respect to valid information.

The current user can further extract a friend subset 214 from his/her own friend corpus 210 (as indicated by arrow B), for example, taking the family members and classmates with a close relationship as members of the friend subset 214, while excluding types of users such as clients and superiors so as to prevent disturbing these users because of the information recommendation.

According to one embodiment of the present invention, the filtering step as indicated by arrow A and the extracting step as indicated by arrow B can also be omitted, or other manners can be employed to control the number of two-tuples in the recommendation list as generated.

A feature library 220 stores content associated with two-tuples in the recommendation list 230, including, but not being limited to: a match degree of an information item with the current user, a match degree of an information item with a target user, and a closeness degree of a target user with the user, etc. It should be noted that the features in the feature library 220 are features for two-tuples, and when ranking the recommendation list, i.e., ranking the two-tuples in the recommendation list, scores of the two-tuples are calculated based on features of each two-tuple and then the two-tuples are ranked. A uniform feature library 220 can be provided, and a feature library 220 for each current user can also be provided; each user individually maintains his/her own feature library, for example, he/she can add a new feature, delete an unexpected feature, or amend the feature value, etc.

As indicated by arrow C, there is illustrated a process of building a recommendation list 230 based on the feature library 220, the information subset 212, and the friend subset 214. The recommendation list 230 includes two-tuples including a target user name and an information item, where each two-tuple can be expressed as <target user name><information item>. As to the specific example as indicated in FIG. 1 in the preceding text, the recommendation list 230 built-up for the current user 1 can be indicated in Table 2 as below. At this point, the current user 1 can automatically provide a correlated information item to a corresponding target user only by selecting an expected two-tuple, without the need of providing information to each user item by item.

TABLE 2

Recommendation List

| Target user name | Information item |
| --- | --- |
| User 2 | Information 1 |
| User 2 | Information 2 |
| User 3 | Information 1 |
| User N | Information 3 |

Besides, scores of respective two-tuples in the recommendation list 230 can be calculated based on the features in the feature library 220, and then this recommendation list is ranked. According to one embodiment, in the ranked recommendation list, two-tuples ranking top have higher scores (for example, indicating a higher recommendation probability), and two-tuples ranking bottom have lower scores (for example, indicating a lower recommendation probability). According to one embodiment of the present invention, only top-10 two-tuples can be displayed according to settings, or two-tuples having a recommendation probability greater than 50% are displayed. After a two-tuple in the recommendation list 230 is selected, associated information items will be sent to the corresponding target users (for example, target user 1, target user 2, . . . , target user N) based on the content of the two-tuple.

Recommending information by using the above method at least has the following advantages: 1) only by selecting a two-tuple, the user can send information conveniently and quickly, without manually sending information one by one; 2) the ranked recommendation list results from the ranking based on the total scores of various aspects of features of the two-tuples, which considers the recommendation probability of "recommending what information to whom" comprehensively, thus it is enabled to accurately recommend to particular users the information in which they are most interested based on the overall score; 3) through steps of filtering information and extracting friend subsets, reliable information is recommended between trusted users, which prevent propagation of spam information to a greater extent.

Figure 3:
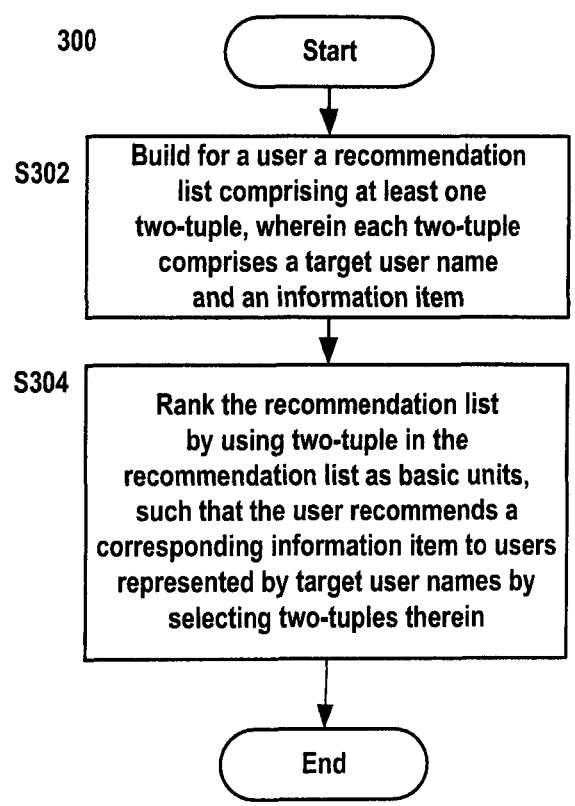
FIG. 3 illustrates a flowchart of a method according to one embodiment of the present invention, wherein there is illustrated a process of recommending information to users within a social network.

FIG. 3 schematically illustrates a flowchart of a method according to one embodiment of the present invention, wherein there is illustrated a process 300 of recommending information to users within a social network. According to one embodiment of this invention, a method is disclosed for facilitating recommending information by users within a computer network-based social network. At step S302, first, a recommendation list including at least one two-tuple is built for a user, wherein each two-tuple includes a target user name and an information item.

According to one embodiment of the present invention, each user in the friend corpus and each piece of information in the information corpus can be combined to form a two-tuple in the recommendation list. A friend subset can also be obtained by filtering the friend corpus, an information subset can be obtained by filtering the information corpus, and a candidate space of a recommendation list is built with the friend subset and the information subset. For example, a recommendation list is built based on a user set including N users and an information set including M pieces of information, then a recommendation list including (N*M) two-tuples can be formed. According to one embodiment of the present invention, those skilled in the art can also set other parameters to control the number of two-tuples and what two-tuples to be included in the recommendation list. According to one embodiment of the present invention, different two-tuples can also be built for a same user, so as to provide candidates of sending the recommended information in different manners (for example, email, SMS, etc.).

It should be noted that although only a specific example of building a recommendation list using two-tuples (target user name, information item) is illustrated in the embodiments as above mentioned, the recommendation list can also be built with multi-tuples such as three-tuple, four-tuple, etc, as long as the multi-tuple includes data on "target user name" and "information item." For example, a three-tuple can be (target user name, information item, information providing manner), wherein the information providing manner indicates a manner of providing information to a target user, including, but not being limited to, internal message within a website, email, SMS, instant message, paging service, and MMS, etc. In an alternative embodiment, the information providing manner can also be hidden in the "target user name" item of a two-tuple. For example, when the content of a "target user name" is Alan@***.com, it is default that the information is provided via email.

For another example, although a two-tuple manner is employed in the above embodiments, those skilled in the art can know that in the process of building a recommendation list using two-tuples for the current user, the meaning of "current user" is also implied. Thus, according to an alternative manner, a recommendation list can be built with a three-tuple, i.e., three-tuple (target user name, information item, current user). The actual meaning of this three-tuple is equivalent to the two-tuple as mentioned above. Under the teaching of this description, those skilled in the art can also build a recommendation list in other multi-tuple manner.

At step S304, the recommendation list is ranked using two-tuples in the recommendation list as basic units, such that, by selecting a two-tuple in the recommendation list, the user can recommend a corresponding information item to a user represented by a target user name. The basic unit here means an indivisible minimum unit or element, and ranking a recommendation list by using each two-tuple as a basic unit means ranking based on using the two-tuples (target user name, information item) in the recommendation list as the indivisible minimum ranking units. Wherein the scores for ranking are also calculated based on the two-duple per se. The recommendation list can be ranked with recommendation probabilities in a descending order, so as to facilitate the user in selecting the recommendation information with a higher recommendation probability.

Figure 4:
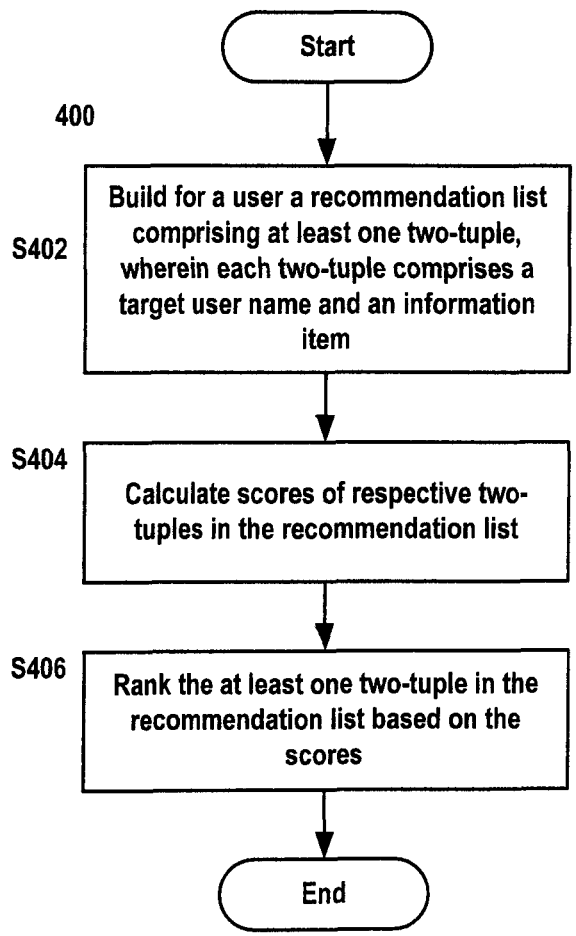
FIG. 4 illustrates a flowchart of a method according to another embodiment of the present invention, wherein there is illustrated an alternative process of recommending information to users within a social network.

FIG. 4 schematically illustrates a flowchart of a method according to another embodiment of the present invention, wherein there is illustrated an alternative process 400 of recommending information to users within a social network. It should be noted that step S402 in FIG. 4 is similar to the step S302 as depicted in FIG. 3. At step S402, a recommendation list including at least one two-tuple is built for a user, wherein each two-tuple includes a target user name and information item.

Step S404 and S406 further illustrate specific steps for ranking the recommendation list obtained at step S402. At step S404, scores of respective two-tuples in the recommendation list are calculated. A score of a two-tuple is an overall expression for a recommendation probability for the two-tuple. The higher the score of the two-tuple is, the higher is the overall fitness degree of the target user in the two-tuple with the information item in this two-tuple as indicated to the current user, namely, the higher is the probability for the current user to select for recommendation. It should be noted that although the score here can represent the meaning of the recommendation probability, the score is not limited to be represented with a real number in the range of [0, 1]; in fact, the value range of the scores can be any arbitrary real number space based on different computational equations. At step S406, at least one two-tuple in the recommendation list is ranked based on the scores.

Figure 5:
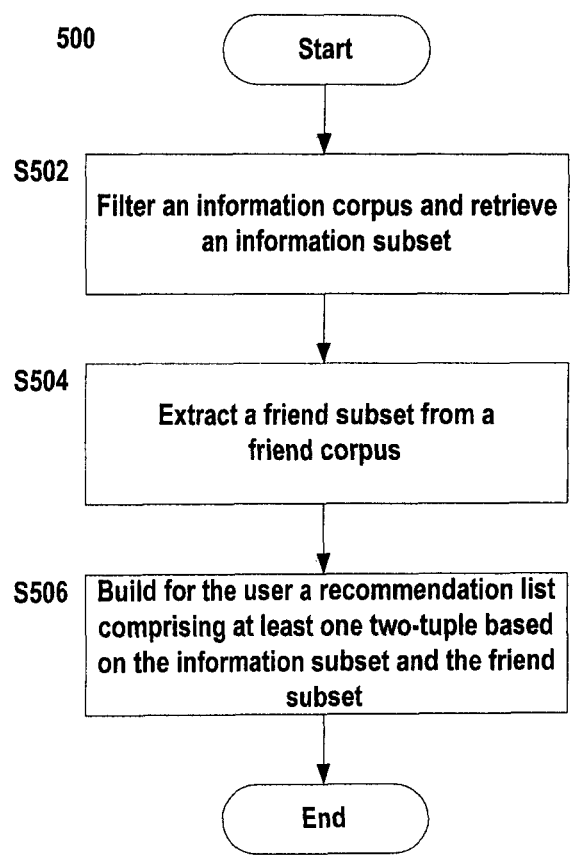
FIG. 5 illustrates a flowchart of a method for building a recommendation list for a user according to a further embodiment of the present invention.

FIG. 5 schematically illustrates a flow chart 500 of a method for building a recommendation list for a user according to a further embodiment of the present invention. At step S502, information subset 212 is obtained by filtering the information corpus 110. As previously mentioned, this filtering steps helps to filter out information with a lower importance level (for example, spam information), so as to improve the availability of recommended information. At step S504, the friend subset 214 is extracted from the friend corpus 210. Extracting the friend subset can facilitate recommending information to users who are deemed important by the current user. According to one embodiment, the current user can set a filtering rule and an extracting rule, which rules can also be added, deleted or modified during the running process. At step S506, based on the information subset and friend subset, a recommendation list including at least one two-tuple is built for the user.

According to one embodiment of the present invention, scores calculated for the two-tuples can involve various aspects. For example, it can involve properties associated with the target user (for example, age, gender, address, graduate school, occupation, hobbies, etc), or properties associated with information item (for example, keywords in the information item), or properties associated with the current user (for example, age, gender, address, graduate school, occupation, hobbies, etc), or combinations of the above properties. According to embodiments of the present invention, a feature can be directly or indirectly correlated to a two-tuple.

A probability or factor possibly involved in the current user recommending a corresponding information item to target users in a two-tuple is called a feature of a two-tuple; a two-tuple can have a plurality of features, and each feature can correspond to different feature values. For example, a match degree of a target user in the two-tuple with the information item can be taken as a feature. For example, if the hobbies of a target user include "piano," while the title of the information item happens to include a keyword "piano," the feature can be given a higher feature value. According to other embodiments of the present invention, other feature values can also be set, which will be described in detail hereunder.

According to one embodiment of the present invention, computing scores of respective two-tuples in the recommendation list includes: computing a feature value of each feature of each two-tuple, and making a weighted sum of the feature values of the respective features as a score of the two-tuple. Each feature of two-tuple indicates one aspect of factor likely affecting the score of the two-tuple. Different factors have different influences on the overall score, thus different weights can be set based on customization of the user or system. Finally, the respective feature values are weighted summed as the overall score of the two-tuple.

According to one embodiment of the present invention, a feature can include a target user's feedback to a previously recommended information item. According to one embodiment of the present invention, the feedback is not directly correlated with a property of a target user name or information item in a two-tuple, but indicates a historical evaluation of the target user on information items previously recommended by the current user. For example, a data structure storing the feedbacks can be set for each user within a social network. When the user receives an information item recommended from other user, he/she can make an evaluation based on whether he/she is interested in the information item and takes this evaluation as the feedback. The data structure for storing the feedbacks can be placed in a feature library, or placed in any location in the social network, as long as data related to the feedback are available when making a weighted sum of the feature values for the feedback.

The target user's feedback to historically recommended information can indicate: whether the target user has read the information items previously recommended by the current user, or the interest level on these information items. The greater the number of information items read by the target user, the higher is the interest level of the target user on the information recommended by the current user. If the target user rejects to read most or all information items recommended by the current user, it is deemed that the target user is not interested in the information items previously recommended by the current user, and therefore it is deemed that the target user probably does not want to receive further recommendations from the current user. Hereinafter, a more detailed embodiment on how to obtain and use a feedback to a recommended information item from a target user is further illustrated.

According to one embodiment, a simple "yes/no" manner can be employed to indicate whether the target user has read the information items previously recommended by the current user, and a ratio of "number of already-read information items to total number of recommended information items" is taken as the feedback. The higher the ratio is, the more the target user likes the current user's recommendation. Alternatively, grading levels can be further set with respect to whether the target user is interested in the recommended information. For example, 5 indicates very interested, 0 indicates totally uninterested, and a function of the scores is taken as a feedback. According to one embodiment, the feedback can indicate the target user's trust degree on the recommender of an information item. According to one embodiment, the feedback can be classified as positive/negative feedback, wherein the positive feedback indicates that the target user is interested in the recommended information and further indicates that he/she trusts the recommender; while the negative feedback indicates that the target user is not interested in the recommended information, therefore indicating that he/she does not trust the recommender, and when the negative feedback reaches a certain threshold, reception of recommendations from the recommender can be blocked. Those skilled in the art can set different feedback manners based on their own experiences.

According to one embodiment of the present invention, a feature can include at least one of: a match degree of an information item with the user, a match degree of the information item with the target user, and a closeness degree of the user with the target user. The match degree between an information item and the user indicates closeness of a correlation between the information item and the user, which, for example, can be determined according to whether various properties of the user match the keywords in the information item, wherein the user properties can, for example, include age, gender, address, graduate school, occupation, hobbies, etc. For example, if the user's graduate school is "Peking University," and the title of an information item received by the user includes news on "Peking University," it can be deemed that the user has a higher match degree with this information item; for another example, if hobbies of a target user include "piano," while a keyword "piano" frequently appears in an information item, it is deemed that this target user has a higher match degree with this information item.

When the social network has a great number of users and a great amount of information, the workload for matching the keywords in the information with user properties one by one will be overwhelmingly heavy. According to one embodiment of the present invention, clusters of users and information can be obtained respectively, and match degrees are calculated based on the clusters, which can greatly alleviate computational complexity. For example, the following steps are adopted: obtaining a cluster of an information corpus correlated to the information item, a cluster of the users, and a cluster of the target users; wherein the match degree of the information item and the user is calculated based on the cluster of the information corpus and the cluster of the user, and the match degree between the information item and the target user is calculated based on the cluster of the information corpus and the cluster of the target users.

An objective of obtaining clusters of information, users, and target users is to divide mass data into typical classes, such that only these typical classes are compared in subsequent operations. For example, a social network can have millions of users, while each user can further have dozens of specific properties. These users can be divided into a plurality of clusters based on the users' properties, for example, {piano, Peking University, . . . }; meanwhile, the information can also be classified into a plurality of clusters, for example, {piano, Peking University, IBM hardware product, . . . }. At this point, the user cluster "piano" is compared with the information cluster "piano" to determine the match degree of the users and information, without the need of comparing each user with each piece of information one by one, thereby greatly alleviating the computational complexity.

Hereinafter, a method for recommending information by a user to users in a social network in a computer network-based social network will be illustrated in one embodiment. For example, an equation for computing a score of each two-tuple in a recommendation list is specified as below:

$$\text{score}(x) = \sum_{i=1}^{k} w_i * x_i \qquad \text{<equation 1>}$$

wherein k indicates the number of features, which is a natural number equal to or greater than 1; $w_i$ indicates the weight of the $i^{th}$ feature, while $x_i$ indicates a value of the $i^{th}$ feature.

Suppose there are information items information 1 and information 2 and users u1, u2, and u3, for example, match degrees between the information items and the user are obtained based on the above mentioned keyword-based match or cluster-based match, as indicated in Table 3.

TABLE 3

Match Degree Between Information Item and User

| Match Degree | Info1 | Info2 |
|---|---|---|
| u1 | 0.3 | 0.4 |
| u2 | 0.5 | 0.2 |
| u3 | 0 | 0.5 |

It should be noted that, since the target user is also a user in the social network, the match degree between the information item and the target user can also be retrieved from Table 3. The target user and the current user are only different names of a user located at different positions in the recommendation relationship. For example, for user u1, when the u1 recommends information to other users as a recommender, it is called the current user; while when user u1 is a recommendee (for example, other users recommend information to user u1), the user u1 is called a target user.

According to one embodiment of the present invention, a feature further includes a closeness degree between a target user and a user. This closeness degree can at least involve one of: a communication frequency between the target user and the user, communication duration, an overlap degree between friend groups, an overlap degree between interests, and a trust level. It can be deemed that the higher the communication frequency between the target user and the user is, the longer the communication duration is, the higher the overlap degree between friend groups is, the higher the overlap degree between interest is, and the higher the trust level is, the higher the closeness degree therebetween is. Moreover, the closeness degree can be updated in real time, such that historical data of previous operations can have an influence on subsequent computing of the total score of the two-tuple. Table 4 illustrates an example of a closeness degree between the target user and the user according to one embodiment of the present invention. It should be noted that because it is default that a user will not recommend information to himself/herself, the closeness degree between the user and himself/herself is set to be "0"; or, if the current user expects to "carbon copy" the recommended information to himself/herself when recommending information to other users, the closeness degree can be set to "1" or other values. It should be noted that the recommended information "carbon copied" by the current user to himself/herself can be particularly marked so as to distinguish over the information received by the current user in a conventional manner. Further, the closeness degree can be an evaluation of a user with respect to a closeness relationship between himself/herself and another user, thus the closeness degree between u2 and u1 is an evaluation made by user u2 himself/herself on the closeness degree between himself/herself and u1, while the closeness degree between user u1 and u2 is an evaluation made by user u1 on the closeness degree between user u1 and u2. These two closeness degrees can be the same or different.

TABLE 4

Closeness Degree Between Users

| Closeness Degree | u1 | u2 | u3 |
|---|---|---|---|
| u1 | 0 | 0.3 | 0.8 |
| u2 | 0.1 | 0 | 0.2 |
| u3 | 1 | 0.2 | 0 |

It should be noted that the numerical values of the match degree and closeness degree as illustrated in Table 3 and Table 4 are only illustrative, and those skilled in the art should understand that other numerical values can also be set based on particular requirements when specifically implementing this invention. In this example, although a real number between the range [0, 1] is employed to indicate the match degree and closeness degree, those skilled in the art can also employ numerical values within other ranges, as long as the numerical values reflect the match degree and closeness degree. It should be noted that according to embodiments of the present invention, a weight of each feature only indicates the relative degree of the contribution of this feature to the total score, and a sum of all weights is not necessarily equal to 1.

In one embodiment of the present invention, when three features are included, namely, the match degree between the information item and the user, the match degree between the information item and target user, and the closeness degree between the target user and the user, a score of a two-tuple in a recommendation list for each of the current users u1, u2, and u3 can be calculated based on the above <equation 1>. Table 5A as below illustrates scores of two-tuples in the recommendation list when the current user is u1 on the basis of Table 3 and Table 4:

TABLE 5A

Recommendation List and Scores of Two-Tuples for User u1

| Feature | Match degree between information item and current user | Match degree between information item and target user | Closeness degree between the target user and the user | Score |
|---|---|---|---|---|
| Weight | 0.1 | 0.2 | 0.5 | |
| (u2, info1) | 0.3 | 0.5 | 0.3 | 0.28 |
| (u2, info2) | 0.4 | 0.2 | 0.3 | 0.23 |
| (u3, info1) | 0.3 | 0 | 0.8 | 0.43 |
| (u3, info2) | 0.4 | 0.5 | 0.8 | 0.54 |

Wherein, for example, the score of the two-tuple (u2, info 1) is calculated by using the above mentioned weight summing equation <equation 1>, namely:

The score of (u2,info1)=0.1×0.3(weight of the match degree between the information item info1 and the current user u1×feature value)+0.2×0.5 (weight of the match degree between the information item info1 and the target user u2×feature value)+0.5×0.3 (weight of the closeness degree between the target user u2 and the user u1×feature value)=0.28

Likewise, the following Table 5B and Table 5C can be derived, which respectively illustrate scores of two-tuples in the recommendation list when the current users are u2 and u3:

TABLE 5B

Recommendation List and Scores of Two-Tuples for User u2

| Feature | Match degree between information item and current user | Match degree between information item and target user | Closeness degree between the target user and the user | Score |
|---|---|---|---|---|
| Weight | 0.1 | 0.2 | 0.5 | |
| (u3, info1) | 0.5 | 0 | 0.2 | 0.15 |
| (u3, info2) | 0.2 | 0.5 | 0.2 | 0.22 |
| (u1, info1) | 0.5 | 0.3 | 0.1 | 0.16 |
| (u1, info2) | 0.2 | 0.4 | 0.1 | 0.15 |

TABLE 5C

Recommendation List and Scores of Two-Tuples for User u3

| Feature | Match degree between information item and current user | Match degree between information item and target user | Closeness degree between the target user and the user | Score |
|---|---|---|---|---|
| Weight | 0.1 | 0.2 | 0.5 | |
| (u1, info1) | 0 | 0.3 | 1 | 0.56 |
| (u1, info2) | 0.5 | 0.4 | 1 | 0.63 |
| (u2, info1) | 0 | 0.5 | 0.2 | 0.2 |
| (u2, info2) | 0.5 | 0.2 | 0.2 | 0.19 |

According to one embodiment of the present invention, a three-tuple can also be used. For example, (current user name, target user name, information item) indicate elements in a recommendation list; an overall table can also be built for all possible three-tuples to illustrate scores and rankings of each possible recommendation combination, as illustrated in Table 5D.

TABLE 5D

Overall Table of Recommendation List and Scores of Three-Tuples

| Feature | Match degree between information item and current user | Match degree between information item and target user | Closeness degree between the target user and the user | Score | Ranking |
|---|---|---|---|---|---|
| Weight | 0.1 | 0.2 | 0.5 | | |
| (u1, u2, info1) | 0.3 | 0.5 | 0.3 | 0.28 | 5 |
| (u1, u2, info2) | 0.4 | 0.2 | 0.3 | 0.23 | 6 |
| (u1, u3, info1) | 0.3 | 0 | 0.8 | 0.43 | 4 |
| (u1, u3, info2) | 0.4 | 0.5 | 0.8 | 0.54 | 3 |
| (u2, u3, info1) | 0.5 | 0 | 0.2 | 0.15 | 11 |
| (u2, u3, info2) | 0.2 | 0.5 | 0.2 | 0.22 | 7 |
| (u2, u1, info1) | 0.5 | 0.3 | 0.1 | 0.16 | 10 |
| (u2, u1, info2) | 0.2 | 0.4 | 0.1 | 0.15 | 12 |
| (u3, u1, info1) | 0 | 0.3 | 1 | 0.56 | 2 |
| (u3, u1, info2) | 0.5 | 0.4 | 1 | 0.63 | 1 |
| (u3, u2, info1) | 0 | 0.5 | 0.2 | 0.2 | 8 |
| (u3, u2, info2) | 0.5 | 0.2 | 0.2 | 0.19 | 9 |

Although Tables 5A to 5D illustrate detailed information of respective features, scores or rankings, according to one embodiment of the present invention, only ranked two-tuples can be displayed to the current user (for example, in the form of a docking window or floating window), so as to display the recommendation list in a smaller space for the current user to select.

According to one embodiment of the present invention, after running a period of time, the user's feedback can be included in the feature. Alternatively, a feedback data table can be set at the initiation of the method (for example, the initial data is 0), and in subsequent running, feedback data between users can be gradually filled in. Table 6 illustrates a feedback data table according to one embodiment of the present invention. Table 6 illustrates feedbacks of target users on the recommended information from the current user, wherein the feedback values can be calculated in the above-mentioned manner or calculated by those skilled in the art in other manners. Although Table 6 employs real numbers within the range [0, 1] to indicate feedbacks, those skilled in the art can employ numerical values within other ranges, as long as the numerical values reflect the target user's interest degree of on the recommended information from the user issuing the recommended information or reflect the trust degree of the target user in the user issuing the recommended information.

TABLE 6

Feedback Data Table

| Feedback | u1 | u2 | u3 |
|---|---|---|---|
| u1 | 0 | 0.2 | 0.9 |
| u2 | 0.5 | 0 | 0 |
| u3 | 0.4 | 0.8 | 0 |

According to one embodiment of the present invention, four feature values can be employed, namely, a match degree between an information item and a user, a match degree between an information item and a target user, a closeness degree between the target user and the user, and feedback of the target user to previously recommended information. Table 7 illustrates an overall table of a recommendation list and scores of three-tuples at this point.

TABLE 7

Overall Table of Recommendation List and Scores of Three-Tuples

| Feature | Match degree between information item and current user | Match degree between information item and target user | Closeness degree between the target user and the user | Feedback | Score | Ranking |
|---|---|---|---|---|---|---|
| Weight | 0.1 | 0.2 | 0.5 | 0.2 | | |
| (u1, u2, info1) | 0.3 | 0.5 | 0.3 | 0.2 | 0.32 | 7 |
| (u1, u2, info2) | 0.4 | 0.2 | 0.3 | 0.2 | 0.27 | 8 |
| (u1, u3, info1) | 0.3 | 0 | 0.8 | 0.9 | 0.61 | 4 |
| (u1, u3, info2) | 0.4 | 0.5 | 0.8 | 0.9 | 0.72 | 1 |
| (u2, u3, info1) | 0.5 | 0 | 0.2 | 0 | 0.15 | 12 |
| (u2, u3, info2) | 0.2 | 0.5 | 0.2 | 0 | 0.22 | 11 |
| (u2, u1, info1) | 0.5 | 0.3 | 0.1 | 0.5 | 0.26 | 9 |
| (u2, u1, info2) | 0.2 | 0.4 | 0.1 | 0.5 | 0.25 | 10 |
| (u3, u1, info1) | 0 | 0.3 | 1 | 0.4 | 0.64 | 3 |
| (u3, u1, info2) | 0.5 | 0.4 | 1 | 0.4 | 0.71 | 2 |
| (u3, u2, info1) | 0 | 0.5 | 0.2 | 0.8 | 0.36 | 5 |
| (u3, u2, info2) | 0.5 | 0.2 | 0.2 | 0.8 | 0.35 | 6 |

The above embodiments illustrate a recommendation list built in the case of including particular features and feature values, and scores of corresponding two-tuples or three-tuples. It should be noted that according to embodiments of the present invention, features can be selected arbitrarily as required, and feature values can be weight summed based on the selected features to calculate total scores of the two-tuples or three-tuples; different weights can be set for respective features as required; and corresponding feature values can be set for respective features based on configurations.

It should be noted that although the recommendation lists as illustrated in Table 5D and Table 7 include a three-tuple, those skilled in the art can easily understand that the three-tuple includes information of a two-tuple built for the current user. In other words, the "current user" as hidden upon building the two-tuple is explicitly added in the three-tuple. Additionally, for a particular current user, those skilled in the art can conveniently extract a recommendation list for a particular current user from the overall table of the recommendation list as illustrated in Table 5D and Table 7.

According to one embodiment of the present invention, an information item in a two-tuple is provided to a target user in the two-tuple in response to receipt of a selection of the two-tuple in the recommendation list. Because information can be provided in a plurality of manners such as internal message within a website, email, SMS, instant message, paging message, and MMS, a situation that user equipment of the target user does not support the type of original information. For example, when a user reads an article in PDF format and wants to send the message in MMS to a mobile phone, those skilled in the art know that the MMS does not support transmission of PDF-format data.

Therefore, according to one embodiment of the present invention, before the provision of the information, a step of data conversion is alternatively included so as to convert the information item into a format supported by the transmission manner, and/or convert the information item to a format/resolution supported by the user equipment of the target user. For example, a PDF-format information item can be converted into a image format and transmitted to a mobile terminal in the form of MMS; a text portion of information in an html webpage format can be extracted and transmitted to the mobile terminal in the form of SMS; a picture message with a resolution of 1600×1200 can be converted into a lower resolution of 400×300 and is then transmitted to the mobile terminal; and so forth.

FIGS. 6A to 6C schematically illustrate different modes of displaying a recommendation list according to one embodiment of the present invention. FIG. 6A illustrates respective two-tuples in a ranking list in a descending order. FIGS. 6B and 6C illustrate other display modes, wherein when a user selects an element in a two-tuple, only the two-tuples including the element can be further displayed, without displaying other two-tuples. FIG. 6B illustrates a display interface when the user selects "a target user 4," where the target user 4 corresponds to information 3 and information 4, and information 3 is displayed before information 4, which indicates that the two-tuple where information 3 is located has a higher score. In a situation where the user selects "information 1" as illustrated in FIG. 6C, information 1 corresponds to target user 1 and target user 2, and target user 1 is in a front position, which indicates that the two-tuple where target user 1 is located has a higher score. In other words, the probability of recommending information 1 to target user 1 is higher than the probability of recommending information to target user 2.

According to other embodiments of the present invention, those skilled in the art can also customize their own manner of displaying a recommendation list. For example, only top 10 or 20 two-tuples are set to be displayed; only two-tuples whose scores are higher than a particular threshold can be displayed, or new two-tuples can be manually added into the recommendation list. For example, if the current user finds that target user 1 is very likely interested in information 3, while the recommendation list does not include a two-tuple (target user 1, information 3), the current user can manually add the two-tuple and then subsequently select this two-tuple for recommendation.

According to one embodiment of the present invention, for information changing in real time (for example, stock market quotations, traffic information, weather forecast, etc), the recommendation information can be automatically sent to a target user at a particular time or in particular intervals in response to selection of a two-tuple in the recommendation list by the current user. For example, if the current user knows that target use 1 focuses much on weather information, he/she can select the two-tuple (target user 1, weather forecast) and further set to send the latest weather forecast to target user 1 at 8:00 am and 8:00 pm every day, respectively. According to one embodiment of the present invention, the current user can also recommend information to a particular user in response to a predetermined event. For example, if the current user can obtain information regarding a stock in real time, the current user can be set to send stock quotation information to target user 1 and target user 2 when the stock quote is higher than a particular price.

According to one embodiment of the present invention, the current user can be an information promoter such as a common individual user or an advertiser. If the information item recommended by the current user to other users is about a certain product, the current user can, for example, get credit scores or other rewards from the manufacturer or advertiser of this product. At this point, if the current user discretionally sends spam advertisements to all other users in order to get credit scores, because embodiments of this invention provide a "feedback" mechanism, the target users are enabled to block reception of the recommended information from the current user through giving a "negative feedback," thereby inhibiting flooding of advertisements.

According to an embodiment of the present invention, feature values of respective features in a two-tuple is dynamically calculated, and the weight of respective values can also be dynamically adjusted.

According to an embodiment of the present invention, the information item is not limited to information obtained by the current user on the basis of computer network or other communication networks, and it can also be information composed by the current user himself/herself, for example, blog update, gathering notice, etc. According to an embodiment of the present invention, the information item can be the recommended information itself or a link address for obtaining the recommended information, for example, a download address for the recommended information or the URL of the webpage where the recommended information is located. According to one embodiment of the present invention, in order to enhance the security of obtaining the recommended information, a password can be set for the recommended information, etc. For example, when a download address for the recommended information is provided via email, a download password can be sent via the form of SMS.

Figure 7:
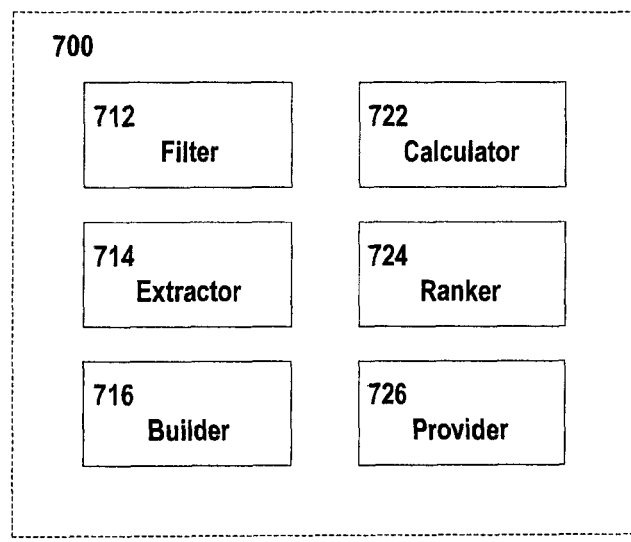
FIG. 7 illustrates an apparatus for recommending information to users within a social network according to one embodiment of the present invention.

FIG. 7 schematically illustrates an apparatus 700 for recommending information to users within a social network according to an embodiment of the present invention. As illustrated in FIG. 7, a filter 712 is for filtering and retrieving an information subset from an information corpus, while an extractor 714 is for extracting a friend subset from a friend corpus. An objective of setting the filter 712 and the extractor 714 is to narrow a candidate space of the two-tuples in the recommendation list (wherein each two-tuple includes a target user name and information item), to avoid provision of spam information because of an unduly broad range, and it is also possible to recommend to target users information of their most interest in a targeted and accurate manner. A builder 716 receives the information subset from the filter 712 and the friend subset from the extractor 714 to build a recommendation list.

A calculator 722 is for calculating scores of respective two-tuples in the recommendation list, namely, calculating a feature value of each feature of each two-tuple, and making a weighted sum of feature values of the features as a score of the two-tuple. A ranker 724 is for ranking the two-tuples in the recommendation list based on calculated scores. A provider 726 is for providing ranked two-tuples for the user to recommend information items to users represented by target user names.

According to embodiments of the present invention, the apparatus 700 can be implemented on a common computer device, or on a mobile computing device having data processing capabilities (for example, a PDA, mobile phone, etc.), where these computing devices are connected to the Internet or a local area network via a wired or wireless network so as to communicate with other users within the social network.

The present invention can adopt a form of hardware embodiment, software embodiment or an embodiment including hardware components and software components. In a preferred embodiment, the present invention is implemented as software, including without limitation to, firmware, resident software, micro-code, etc.

Moreover, the present invention can be implemented as a computer program product usable from computers or accessible by computer-readable media that provide program code for use by or in connection with a computer or any instruction executing system. For the purpose of description, a computer-usable or computer-readable medium can be any tangible means that can contain, store, communicate, propagate, or transport the program for use by or in connection with an instruction execution system, apparatus, or device.

The medium can be an electric, magnetic, optical, electromagnetic, infrared, or semiconductor system (apparatus or device), or propagation medium. Examples of the computer-readable medium can include the following: a semiconductor or solid storage device, a magnetic tape, a portable computer diskette, a random access memory (RAM), a read-only memory (ROM), a hard disk, and an optical disk. Examples of the current optical disk include a compact disk read-only memory (CD-ROM), compact disk-read/write (CR-ROM), and DVD.

A data processing system suitable for storing or executing program code can include at least one processor that is coupled to a memory element directly or via a system bus. The memory element can include a local memory usable during actually executing the program code, a mass memory, and a cache that provides temporary storage for at least one portion of program code so as to decrease the number of times for retrieving code from the mass memory during execution.

An Input/Output or I/O device (including, without limitation to, a keyboard, a display, a pointing device, etc.) can be coupled to the system directly or via an intermediate I/O controller.

A network adapter can also be coupled to the system such that the data processing system can be coupled to other data processing systems, remote printers or storage devices via an intermediate private or public network. A modem, a cable modem, and an Ethernet card are merely examples of a currently usable network adapter.

It is to be understood from the foregoing description that modifications and alterations can be made to the respective embodiments of the present invention without departing from the true spirit of the present invention. The description in the present specification is intended to be illustrative and not limiting. The scope of the present invention is limited by the appended claims only.

We claim:

1. A method for facilitating recommending information by users within a computer social network, comprising:
building for a user a recommendation list comprising at least one two-tuple, wherein each two-tuple comprises a target user name and an information item, wherein the target user name represents a target user and the information item represents information to be sent to the target user, and wherein a first two-tuple in the recommendation list comprises a first target user name and a first information item;
ranking the recommendation list by using two-tuples in the recommendation list as basic units;
displaying the recommendation list to the user;

receiving from the user a selection of the first two-tuple in the recommendation list; and interpreting the selection of the first two-tuple in the recommendation list as a recommendation of the first information item to a first target user represented by the first target user name, wherein the first two-tuple represents both the first information item and the first target user, and wherein selection of the first two-tuple simultaneously selects both the first information item and the first target user for the recommendation.

2. The method according to claim 1, wherein ranking the recommendation list comprises:

calculating scores of respective two-tuples in the recommendation list; and ranking the two-tuples in the recommendation list based on the scores.

3. The method according to claim 2, wherein each two-tuple has an associated feature, and calculating scores of respective two-tuples in the recommendation list comprises:

calculating a feature value of each feature of each two-tuple, and making a weighted sum of feature values of the features as a score of the two-tuple.

4. The method according to claim 3, wherein the a feature of the first two-tuple comprises a feedback to a previously recommended information item from the first target user of the first two-tuple.

5. The method according to claim 3, wherein the a feature of the first two-tuple comprises at least one of: a match degree between the first information item and the user, a match degree between the first information item and the first target user, and a closeness degree between the first target user and the user.

6. The method according to claim 5, further comprising:

obtaining a cluster of an information corpus associated with the first information item, a cluster of the user, and a cluster of the first target user;

wherein the match degree between the first information item and the user is calculated based on the cluster of the information corpus and the cluster of the user, and the match degree between the first information item and the first target user is calculated based on the cluster of the information corpus and the cluster of the first target user.

7. The method according to claim 5, wherein the closeness degree between the first target user and the user involves at least one of:

a communication frequency between the first target user and the user, communication duration, an overlap degree between respective friend groups, an overlap degree between respective interests, and a degree of trust established between the user and the first target user.

8. The method according to claim 1, further comprising: providing the first information item in the first two-tuple to the first target user of the first two-tuple in response to receipt of the selection of the first two-tuple in the recommendation list.

9. The method according to claim 8, wherein providing the information item in the first two-tuple to the first target user of the first two-tuple is implemented through at least one of:

internal message within a website, email, SMS, instant message, paging message, and MMS.

10. The method according to claim 1, wherein feature values of respective features of the first two-tuple are dynamically calculated.

11. An apparatus for facilitating recommending information by users within a computer social network, comprising:

a builder configured to build for a user a recommendation list comprising at least one two-tuple, wherein each two-tuple comprises a target user name and an information item, wherein the target user name represents a target user and the information item represents information to be sent to the target user, and wherein a first two-tuple in the recommendation list comprises a first target user name and a first information item;

a sorter configured to rank, with a computer processor, the recommendation list by using two-tuples in the recommendation list as basic units;

a display configured to display the recommendation list to the user; and a recommender configured to receive from the user a selection of the first two-tuple in the recommendation list, and further configured to interpret the selection of the first two-tuple as a recommendation of the first information item to a first target user represented by the first target user name, wherein the first two-tuple represents both the first information item and the first target user, and wherein selection of the first two-tuple simultaneously selects both the first information item and the first target user for the recommendation.

12. The apparatus according to claim 11, wherein the sorter comprises:

a calculator for calculating scores of respective two-tuples in the recommendation list; and a ranker for ranking the two-tuples in the recommendation list based on the scores.

13. The apparatus according to claim 12, wherein each two-tuple has an associated feature, and the calculator comprises:

means for calculating a feature value of each feature of each two-tuple, and making a weighted sum of feature values of the features as a score of the two-tuple.

14. The apparatus according to claim 13, wherein the a feature of the first two-tuple comprises a feedback to a previously recommended information item from the first target user of the first two-tuple.

15. The apparatus according to claim 13, wherein a feature of the first two-tuple comprises at least one of: a match degree between the first information item and the user, a match degree between the first information item and the first target user, and a closeness degree between the first target user and the user.

16. The apparatus according to claim 15, further comprising:

means for obtaining a cluster of an information corpus associated with the first information item, a cluster of the user, and a cluster of the first target user;

wherein the match degree between the first information item and the user is calculated based on the cluster of the information corpus and the cluster of the user, and the match degree between the first information item and the first target user is calculated based on the cluster of the information corpus and the cluster of the first target user.

17. The apparatus according to claim 15, wherein the closeness degree between the first target user and the user involves at least one of:

a communication frequency between the first target user and the user, communication duration, an overlap degree between respective friend groups, an overlap degree between respective interests, and a degree of trust established between the user and the target user.

18. The apparatus according to claim 11, further comprising:

a provider configured to provide a first information item in the first two-tuple to the first target user of the first two-tuple in response to receipt of the selection of the first two-tuple in the recommendation list.

19. The apparatus according to claim 18, wherein providing the information item in the first two-tuple to the first target user of the first two-tuple is implemented through at least one of:

internal message within a website, email, SMS, instant message, paging message, and MMS.

20. The apparatus according to claim 11, wherein feature values of respective features of the first two-tuple are dynamically calculated.

* * * * *